May 7, 1957 L. B. MITCHELL 2,791,748
VOLTAGE TESTER
Filed Oct. 7, 1953 3 Sheets-Sheet 1
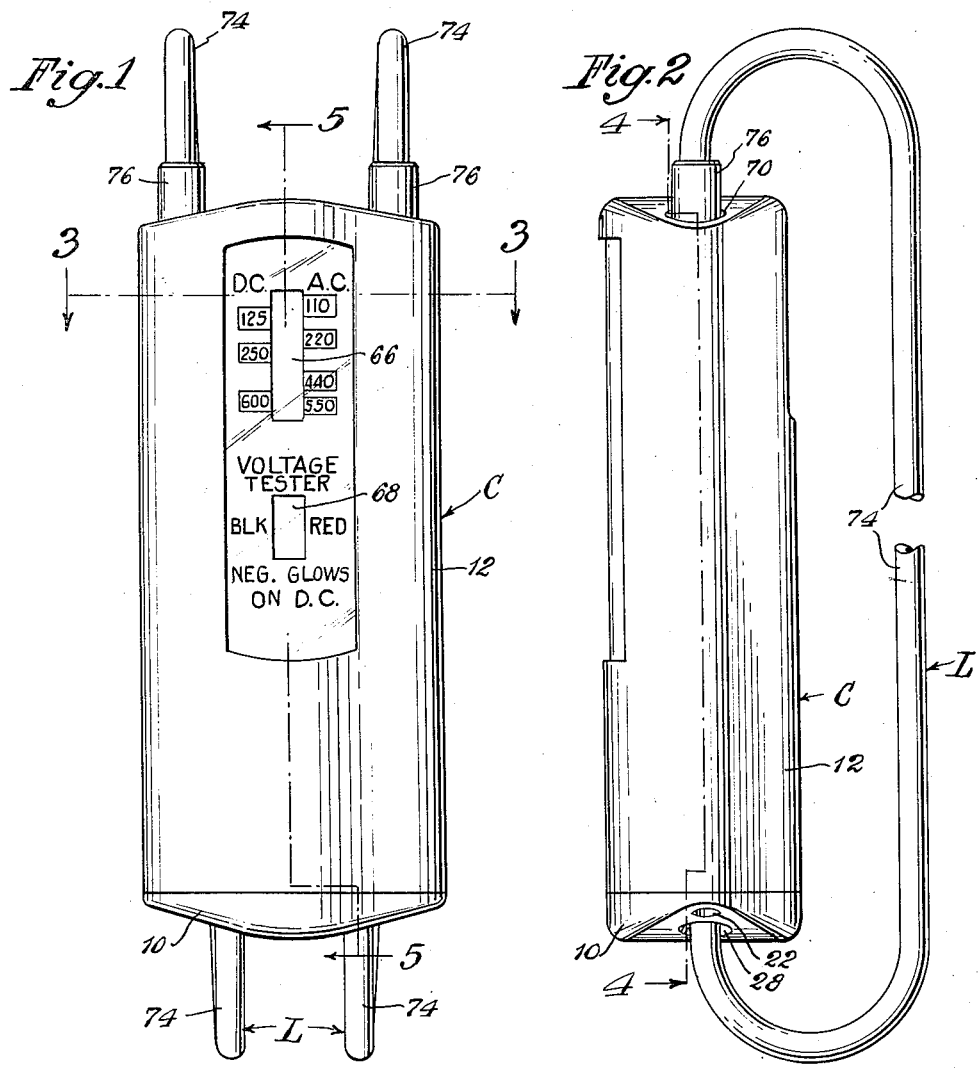
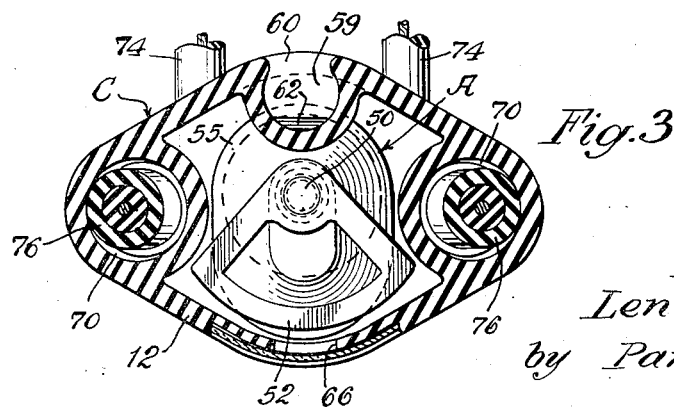
Inventor
Len B. Mitchell
by Parker & Carter
Attorneys

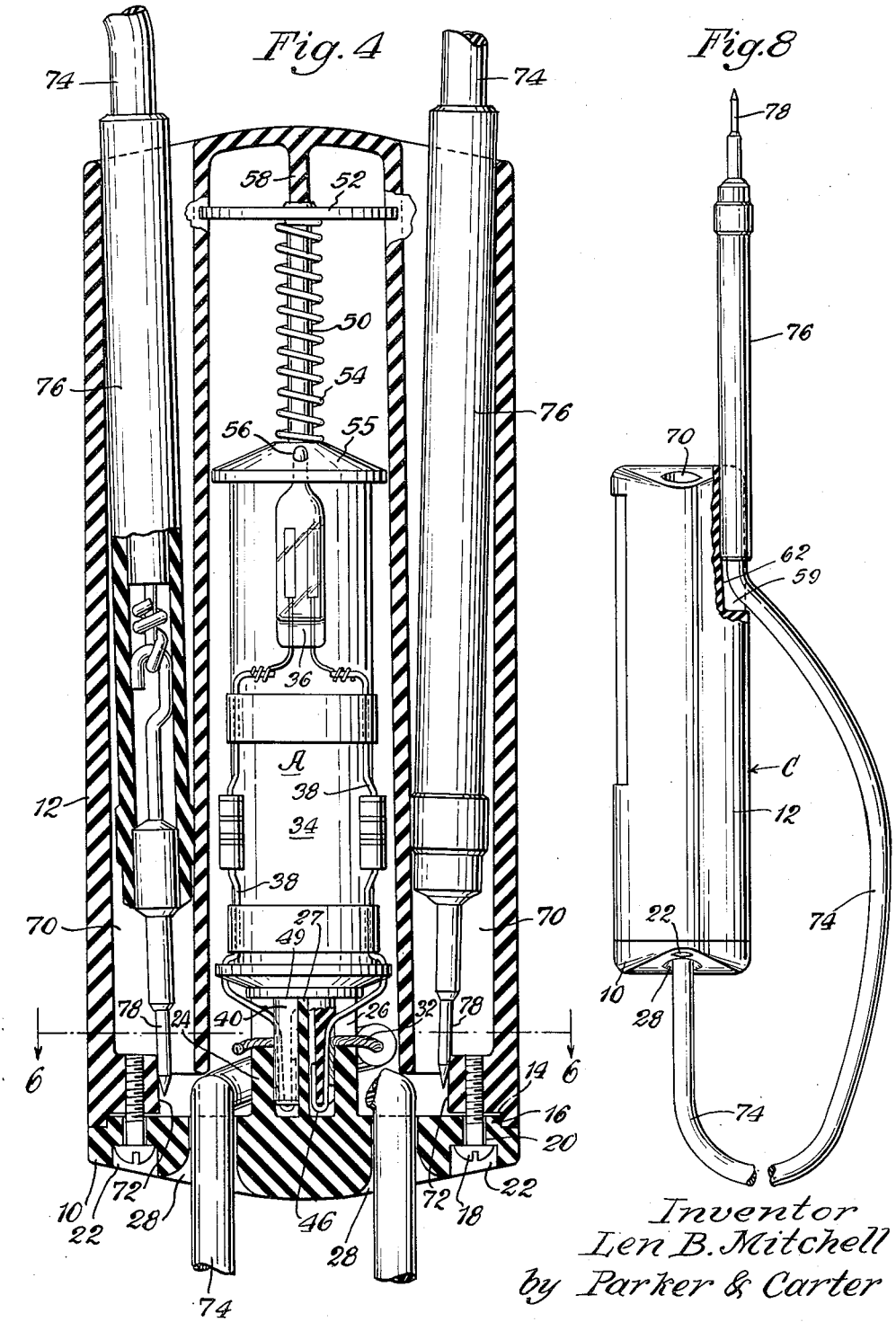

May 7, 1957 L. B. MITCHELL 2,791,748
VOLTAGE TESTER
Filed Oct. 7, 1953 3 Sheets-Sheet 3
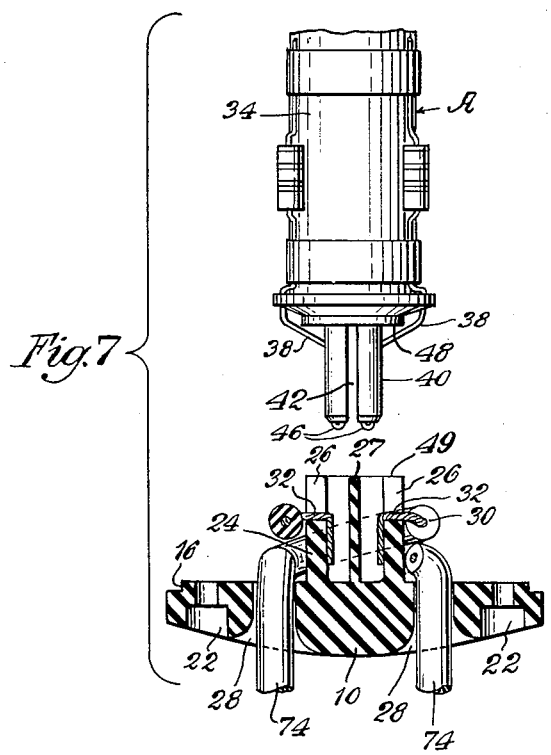
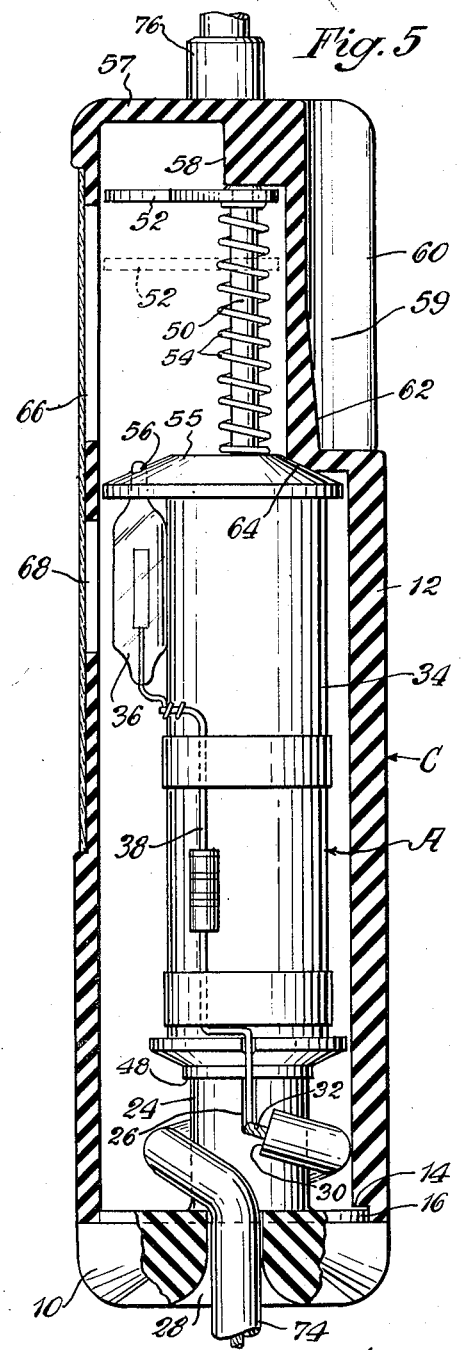
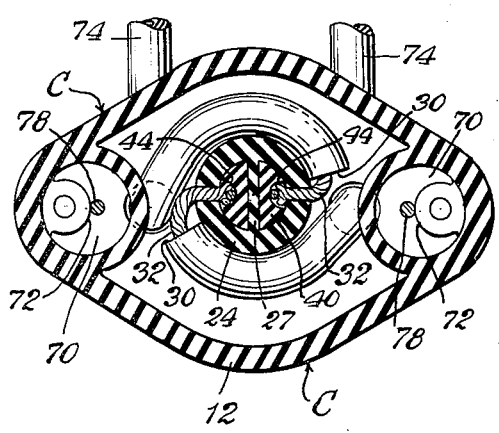
Inventor
Len B. Mitchell
by Parker & Carter
Attorneys

United States Patent Office 2,791,748
Patented May 7, 1957

2,791,748
VOLTAGE TESTER

Len B. Mitchell, Sycamore, Ill., assignor to Ideal Industries, Inc., Sycamore, Ill., a corporation of Delaware Application October 7, 1953, Serial No. 384,724

4 Claims. (Cl. 324—149)

My invention resides in the field of electrical testing apparatus or device for contacting and indicating the magnitude or other characteristics of an electric current in a circuit.

A primary object of my invention is a new and improved electrical testing device with an improved casing or housing structure.

Another object of my invention is a new and improved electrical testing apparatus having a pair of flexible leads with contact elements or prods on the ends extending from the housing structure, the housing structure having means for enclosing, confining, and seating the contact elements or prods when the device is not in use.

Another object of my invention is a testing apparatus of the above type in which the contact elements or prods are totally enclosed by but removably held within the housing structure when the device is not in use.

Another object of my invention is a testing apparatus of the above type in which the contact elements or prods are totally enclosed by but removably held within the housing structure when the device is not in use.

Another object of my invention is a testing device of the above type in which the contact elements or prods are seated and enclosed in the housing and are removably locked therein so that they will not fall out when the unit is subjected to rough handling.

Another object of my invention is an electrical tester housing with a socketing means for positioning and removably mounting either one of the contact elements or prods on it, in a rigid position extending from the housing so as to be operable with it.

Another object of my invention is an electrical tester housing of the above type with a new and improved internal structure for mounting the device's coil assembly in a readily removable and mountable and, at the same time, a shockproof manner.

Other objects of my invention will appear from time to time in the ensuing specification and drawings in which:

Figure 1 is a front view of my tester;

Figure 2 is a side view of the tester shown in Figure 1;

Figure 3 is a sectional view taken along line 3—3 of Figure 1;

Figure 4 is a sectional view taken along line 4—4 of Figure 2;

Figure 5 is a sectional view taken along line 5—5 of Figure 1;

Figure 6 is a sectional view taken along line 6—6 of Figure 4;

Figure 7 is an exploded view of mounting structure for the coil assembly; and

Figure 8 is a side view similar to Figure 2, but on a reduced scale, showing one of the contact elements mounted on the housing structure.

In Figure 1, I have shown my electrical tester which includes a casing or housing structure, indicated generally at C, with a contact lead structure extending from it indicated generally at L. The casing has a base 10 and a housing cover 12 mounted thereon. The interior of the housing is generally open and accessible to house and protect a coil assembly A to be described herein below. The housing cover fits down on the base, the lower opening of the housing cover being recessed at 14, the base having a corresponding projecting boss 16 which fits into the recess. The base and housing are secured together by any suitable means, such as the screws 18. Any suitable number of screws can be used, and the openings 20 in the base for receiving the screws are countersunk, as at 22, so that the heads of the screws are above the exterior surface of the base.

A raised socket 24 extends upwardly from its inner surface, the socket having notches 26 cut in each side and a center wall 27. The socket is approximately centrally disposed on the base, as shown in Figures 4 and 6, and directly adjacent the socket and on each side of it, a pair of openings 28 pass through the base so that the insulated lead structure L can be inserted through the bottom of the base and into the casing. The leads pass about the socket 24, each of the leads having its end stripped of insulation, as indicated generally at 30, and the exposed wire 32 on each lead passes through the slot 26 in the socket and is turned downwardly, as shown in Figure 7, for reasons as set forth below.

The coil assembly A is positioned and held in the casing by a vibration and shockproof mounting. The coil assembly includes a coil 34, a lamp 36, positioned on the outside of the coil and appropriate leads 38 extending downwardly, as shown in Figure 5, to a tapered stem 40. The stem has a longitudinal groove 42 and has grooves along its outer surface on each side at 44 in Figure 6. The ends of the leads 38 extend along the grooves 44 in the sides of the stem and curl under and into the longitudinal slot 42 as shown at 46 in Figure 4.

The slot 42 allows the two halves of the stem to flex slightly so that, when it is forced into the socket on the base, a wedge fit will be effected, and the coil assembly will be tightly and rigidly mounted thereon with the slot 42 fitting over the outer wall 27 in the socket. The stem is forced downwardly into the socket until an abutting surface 48 on the lower part of the coil assembly engages the upper flat surface 49 of the socket. When these two surfaces engage, the stem is tightly wedged in the socket, and the coil and base with the housing cover can be easily and safely manipulated by a repairman or operator without the coil assembly falling off and being injured. It should be noted that the coil assembly is not permanently mounted on the base, and it will be explained below that it is not connected to the housing cover 12.

The coil assembly has a conventional central opening and an armature 50 positioned therein, the armature having an indicator segment 52 at its upper end and a coil spring 54 surrounding it, the spring biasing the armature upwardly to its upper position, shown in Figures 4 and 5, when the coil is not energized. The top of the coil is provided with a cap 55 made of any suitable insulating material, the cap being connected to the supporting structure of the coil and having a sloping upper surface, as shown in Figures 4 and 5. An aperture 56 in the cap provides a mounting for the upper end of the lamp 36.

The housing cover 12 is generally hollow and is closed only at its upper end 57. An abutment 58 is provided in the upper end to define the upper limit of movement of the armature under the bias of the coil spring. Socketing means 59 is provided on the back of the housing cover, the socket being exposed through a slot 60 in the rear wall of the housing cover. The inner wall of the socketing means is tapered and flat, as at 62, to provide a wedging action against the lower end of the prod handles when they are inserted into the socketing means, as shown in Figure 8. This wedging surface stops the lower end of either prod handle at a convenient distance from the bottom of the socket 59 so that the flexible lead can pass outwardly, as shown in Figure 8, without being subjected to excessive bending.

The inward protrusion of the rear wall of the housing cover formed by the socketing means provides an abutment 64 against which the sloping surface of the cap 55 on the coil assembly abuts. The parts are dimensioned so that when the abutting surface 48 on the lower end of the coil assembly engages the upper flat surface 49 of the socket, the cap 55 on the coil assembly engages the abutment 64, and the base 10 will be approximately fully seated and closing the open end of the housing cover, as shown in Figure 5, with the projecting boss 16 approximately fully inserted into the recess 14. The front wall of the housing cover is provided with a pair of windows 66 and 68 with appropriate graduations along the outside of the windows as shown in Figure 1. The upper window 66 provides vision access to indicator segment 52 when the armature is pulled down by energization of the coil. The lower window 68 provides vision access to the lamp 36. On each side of the housing cover, a longitudinal tubular passage or channel 70 is provided, each of the passages extending from one end of the housing cover to the other. The diameter of each of the passages is such that it will receive the prod handles and allows it to slide freely. The lower end of each of the passages is partially closed by a circular wedging and connecting projection 72, as shown in Figures 3 and 4. The projections are apertured and threaded so that they receive the screws 18 which secure the housing cover to the base.

The insulated leads and the contact prod assembly L is composed of a pair of leads 74, each of which extends through one of the openings 28 in the base, and the other end of the lead is provided with a prod handle structure 76. This prod handle structure is generally cylindrical. However, it could be of any design and construction as the details of it do not form and are not pertinent to this invention. A metal pointed prod 78 extends from the end of the handle structure so that the prods can be placed in contact with a circuit to be tested while the operator manipulates the handle 76, it being understood that the handles are made of an insulating material. The prod handles are inserted into the tubular passages 70 when the device is not in use and the metallic prod 78 contacts the wedging projection 72. If the prod handle is canted slightly by the operator in the tubular passage 70, the pointed end of the prod will slip past the side of the wedging projection 72, as shown in Figure 4, and the prod handle can be forced a little further into the passage. This movement is stopped by the wedging action of the pointed prods and the wedging projections 72 after only a slight movement. In the position shown in Figure 4, the prod handles will be tightly wedged in the tubular passage 70 and they can only be removed by the operator and will not fall by gravity if the tester is turned upside down. The prods are both positioned in the housing in Figure 4 when the tester is not in use. The elongated tubular passages 70 are long enough to receive almost the entire length of the handle structure. As shown in Figure 3, the passages 70 protrude inwardly and prevent the indicator segment 52 from unauthorizedly rotating out from in front of the upper window 66.

The use, operation, and function of my invention are as follows: This tester is composed primarily of three units; namely, the case C with the base 10 and housing cover 12; the coil assembly A with the coil body 34, the indicating mechanism 36 and 52, and the coil mounting structure with the socket 24 on the base, and the tapered stem 40 on the coil structure; and the insulated lead structure L with the prod handle 76, the exposed pointed metallic prod 78 and insulated lead 74.

The base of the case C has the socket 24 within which the coil structure A is mounted and completely supported. The housing cover 12 can be completely removed and the coil assembly will remain rigidly mounted on the base due to the wedge fit between the socket 24 and the split stem 40. Electrical connection between the coil assembly A and the insulated lead structure L is acquired through the socket and stem mounting between the coil assembly and the base. The leads 38 extending down the side of the coil snap around the two portions of the slit stem, as shown in Figures 4 and 7. The stripped ends 32 of the insulated leads bend over and through the slots 26 and extend downwardly into the socket. When the split stem is forced downwardly into the socket, the center wall 27 guides the stem and effects an electrical contact between the ends of the leads 38 and the stripped ends 32 of the insulated wires. Thus, no soldering or permanent electrical connection is made. The coil assembly can be rapidly and quickly mounted or dismounted on the base. The socket, in effect, wedges with the stem both to rigidly mount and support the coil assembly, as well as to establish an effective electrical connection between the insulated leads and the coil circuit.

In the housing cover 12, the socketing means 59 provides a rigid mounting for either one of the prod handles. Thus, the device can be easily manipulated by the operator because he can hold the unit with the first prod handle mounted on it in one hand with the second prod handle in the other hand. If he were required to use both hands for the two prod handles, he would be forced to set the case C down where it would be difficult to observe. Also, the abutment 64 formed by the socketing means provides a shockproof mounting for the coil assembly within the casing. The cylindrical passages 70 provide a storage space for the somewhat treacherous pointed prod handle assemblies, and the wedging and connecting projection 72 in the lower end of the passages tightly wedge the prod handles so that they will not be shaken or fall out and, at the same time, the projections 72 provide a connection between the base 10 and housing cover 12. The tapered or slanted wall 62 in the back of the socketing means 59 provides a tight wedging fit between either one of the prod handles and the housing cover, and it also limits the distance either of the prod handles can be inserted so that the insulated lead will not be bent excessively.

The details of the coil circuit are conventional and form no part of my invention. Suffice it to say that any satisfactory circuit could be used.

While I have shown and described the preferred form of my invention, it should be understood that many modifications, changes, alterations, or substitutions can be made without departing from the essential theme of my invention, and I desire that my invention be unrestricted except by the appended claims.

I claim:

1. In an electrical testing apparatus, a casing having a base, an elongated housing cover removably mounted on the base and extending from it, an electric testing circuit assembly mounted within the casing, a pair of insulated leads extending through one end of the casing and electrically connected to the circuit assembly, the leads having prod handles at their extremities with exposed contacts mounted on the ends thereof, the housing cover having elongated tubular enclosed passages closed at one end by the base and open at the other end for insertion of the prod handles, and a wedging abutment centrally disposed in each passage to coact with the exposed contact on the prod handle, the wedging abutment being an integral part of the casing and disposed at the closed end of the passage, the abutment being arranged to flex the prod handle diagonally across the passage in contact with each side at opposite ends when the exposed contact is fully wedged, both passages opening at the opposite end of the housing from the end through which the insulated leads extend.

2. The structure of claim 1 in which the base closes the passages at one end of the cover with the passages being open at the other end, the wedging abutments being an integral part of the housing cover.

3. In a device for testing electric circuits and the like, a casing having a base, an elongated generally hollow housing cover closed only at one end and disconnectively mounted on the base at the other generally open end, an electric testing circuit coil assembly mounted on the base and projecting into the generally open end of the housing so as to be closed by it, a pair of insulated electrical leads extending through openings in the base and electrically associated with the coil assembly, the leads having handle structures with exposed contacts on the ends of them, a socket element on the inner surface of the base projecting into the housing cover, a wedge element on the coil assembly insertable into the socket element to firmly support the coil assembly without support for it by the housing cover, an abutment in the housing to firmly engage the other end of the coil assembly when the base is fully seated on the housing cover to force it fully into the socket element, the wedge element on the coil assembly being composed of a pair of projecting elements insertable into the socket element on the base, the ends of the electrical leads being stripped of insulation, the socket element having grooves along its side into which the stripped ends of the leads are inserted, exposed contacts on the coil assembly each positioned along the side of one of the projecting elements, and means for positioning the wedge element, when inserted into the socket element, in a predetermined position with respect to the slots in the side of the socket element so that the exposed contacts on the coil assembly engage the stripped ends of the leads.

4. The structure of claim 3 in which the abutment in the housing that engages the coil assembly includes an offset portion in the housing cover formed into an outwardly opening socket means whereby either of the handle structures can be mounted on the casing to be manipulated as a unit with the casing.

References Cited in the file of this patent
UNITED STATES PATENTS

| | | |
|---|---|---|
| 2,586,203 | Boyle | Feb. 19, 1952 |
| 2,632,785 | Knopp | Mar. 24, 1952 |
| 2,644,131 | Walraven | June 30, 1953 |